United States Patent
Dumas

(10) Patent No.: US 10,186,919 B2
(45) Date of Patent: Jan. 22, 2019

(54) MAGNET-BEARING MOVING PART FOR PERMANENT MAGNET SYNCHRONOUS MACHINE

(71) Applicant: LOHR ELECTROMECANIQUE, Hangenbieten (FR)

(72) Inventor: Pierre Dumas, Strasbourg (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 459 days.

(21) Appl. No.: 14/768,862

(22) PCT Filed: Feb. 20, 2014

(86) PCT No.: PCT/FR2014/050352
§ 371 (c)(1),
(2) Date: Aug. 19, 2015

(87) PCT Pub. No.: WO2014/128410
PCT Pub. Date: Aug. 28, 2014

(65) Prior Publication Data
US 2016/0006306 A1    Jan. 7, 2016

(30) Foreign Application Priority Data
Feb. 20, 2013 (FR) ..................................... 13 51422

(51) Int. Cl.
*H02K 1/28* (2006.01)
*H02K 15/03* (2006.01)
(Continued)

(52) U.S. Cl.
CPC ............. *H02K 1/28* (2013.01); *H02K 1/2786* (2013.01); *H02K 15/03* (2013.01); *H02K 21/12* (2013.01)

(58) Field of Classification Search
CPC ........ H02K 15/03; H02K 1/2786; H02K 1/28; H02K 21/12

USPC ......................................... 310/156.18; 29/598
See application file for complete search history.

(56) References Cited

U.S. PATENT DOCUMENTS 4,973,871 A    11/1990 Bisantz
7,573,168 B2    8/2009 Carl, Jr. et al.
(Continued)

FOREIGN PATENT DOCUMENTS

WO    WO 2010109056 A1 *   9/2010    ............. H02K 1/278

OTHER PUBLICATIONS

International Search Report from parent PCT application PCT/FR2014/050352 dated Jun. 3, 2014, 3 pages.
(Continued)

*Primary Examiner* — Alex W Mok
(74) *Attorney, Agent, or Firm* — Tech Valley Patent, LLC; John Pietrangelo

(57) ABSTRACT

The moving part, designed to move past a fixed rotor with coils, comprises a metallic chassis to which magnets, arranged in parallel rows of alternating polarity, are bonded. Non-metallic fixing strips, screwed to the chassis, are positioned longitudinally between each row of magnets, extend along the entire length of these rows and mechanically immobilize the magnets. Each fixing strip comprises a bearing base with convex rounded flanks which immobilize the magnets vertically and collaborates with a concave rounded portion, formed in the adjacent edge face of the magnets over at least half of the height thereof. The strip also comprises a longitudinal upper extension acting as a spacer between the rows of magnets and immobilizing the magnets laterally. The invention is of benefit to the manufacturers of rotary or linear electrotechnical machines such as motors or generators.

21 Claims, 7 Drawing Sheets

(51) Int. Cl.
*H02K 21/12* (2006.01)
*H02K 1/27* (2006.01)

(56) References Cited

U.S. PATENT DOCUMENTS

| | | | |
|---|---|---|---|
| 7,888,835 B2* | 2/2011 | Yang | H02K 1/278 |
| | | | 310/156.09 |
| 2006/0220483 A1 | 10/2006 | Jones et al. | |
| 2006/0284506 A1* | 12/2006 | Kim | H02K 1/2733 |
| | | | 310/156.13 |
| 2008/0093945 A1* | 4/2008 | Gruenhagen | H02K 1/278 |
| | | | 310/156.19 |
| 2009/0251023 A1 | 10/2009 | Nakano et al. | |
| 2012/0001508 A1 | 5/2012 | Mantere et al. | |
| 2012/0217834 A1* | 8/2012 | Lutz | H02K 1/2753 |
| | | | 310/156.39 |
| 2013/0200735 A1* | 8/2013 | Lynch | H02K 1/28 |
| | | | 310/59 |
| 2013/0285499 A1* | 10/2013 | Thomas | H02K 1/278 |
| | | | 310/156.19 |

OTHER PUBLICATIONS

Hanselman, Duane C., "Brushless Permanent-Magnet Motor Design," in "Brushless Permanent-Magnet Motor Design," McGraw-Hill, XP055121095, pp. 117-121, Jan. 1, 1994.
Written Opinion (in French) from parent PCT application PCT/FR2014/050352, 7 pages.
Translation of Written Opinion from parent PCT application PCT/FR2014/050352, 9 pages.

* cited by examiner

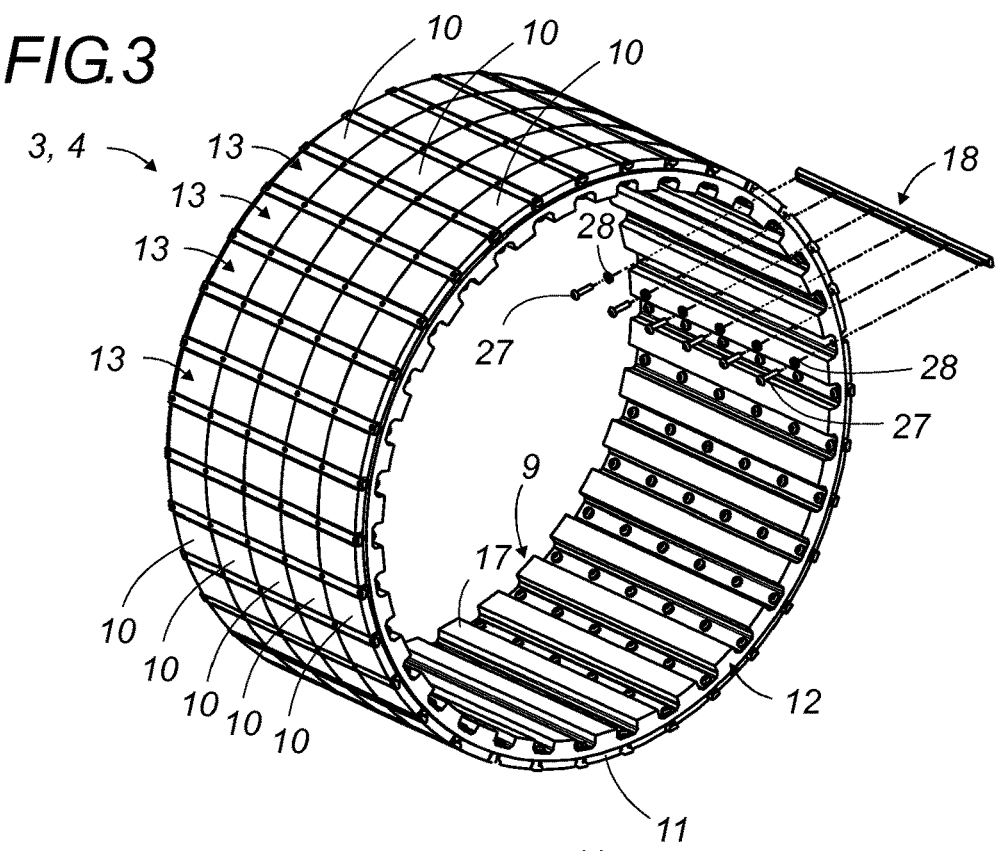
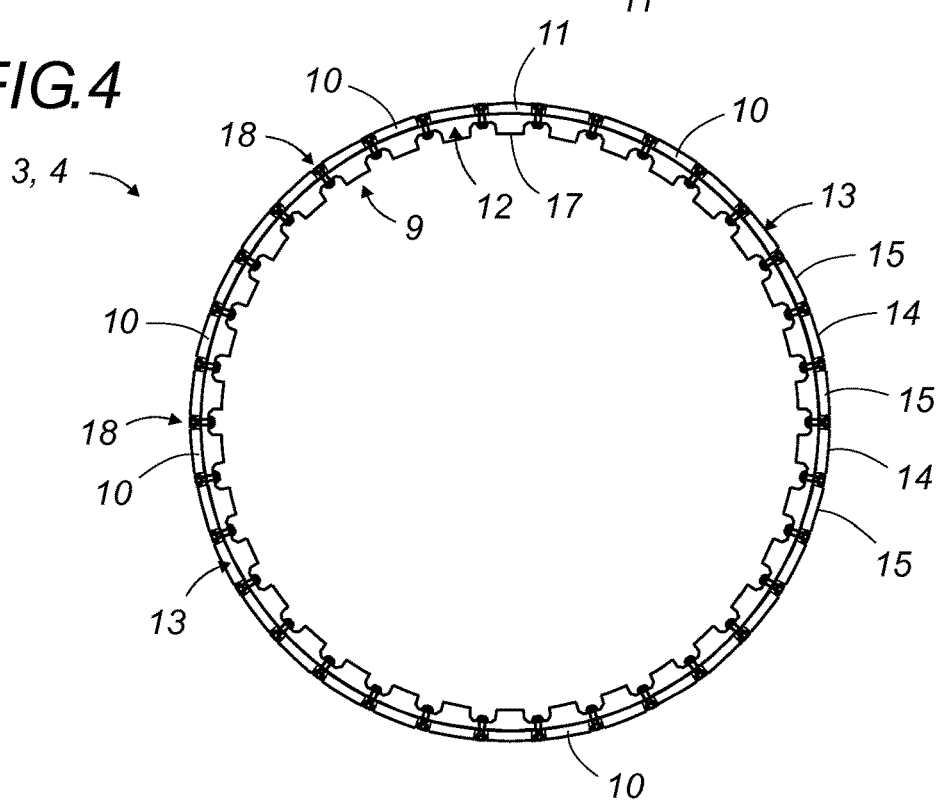

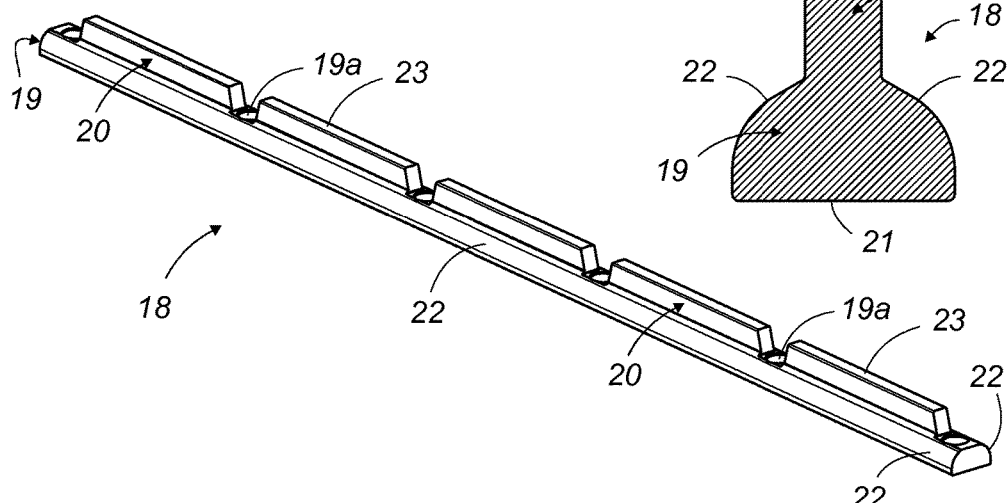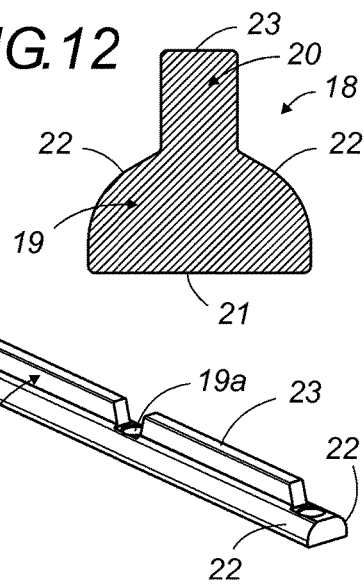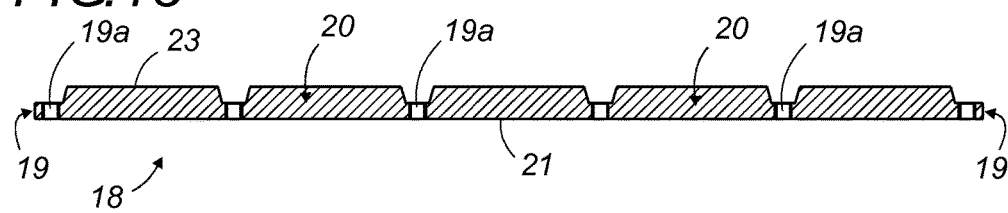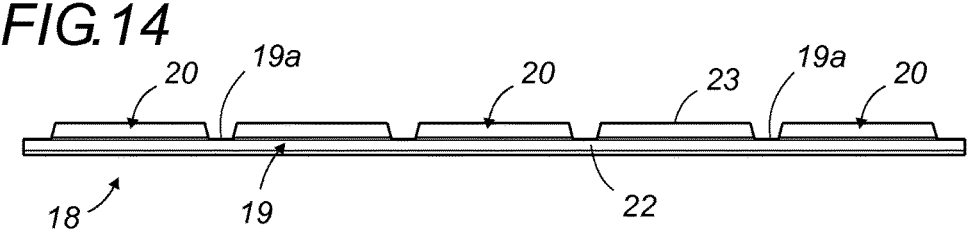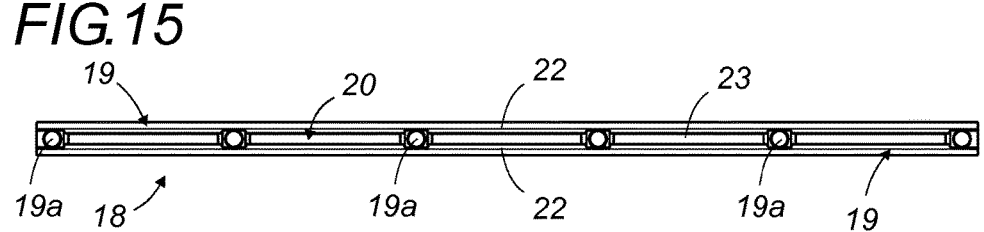

FIG. 16
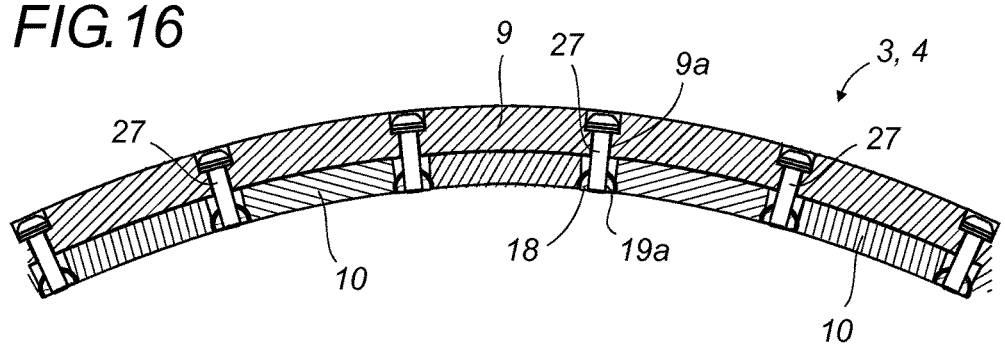
FIG. 17
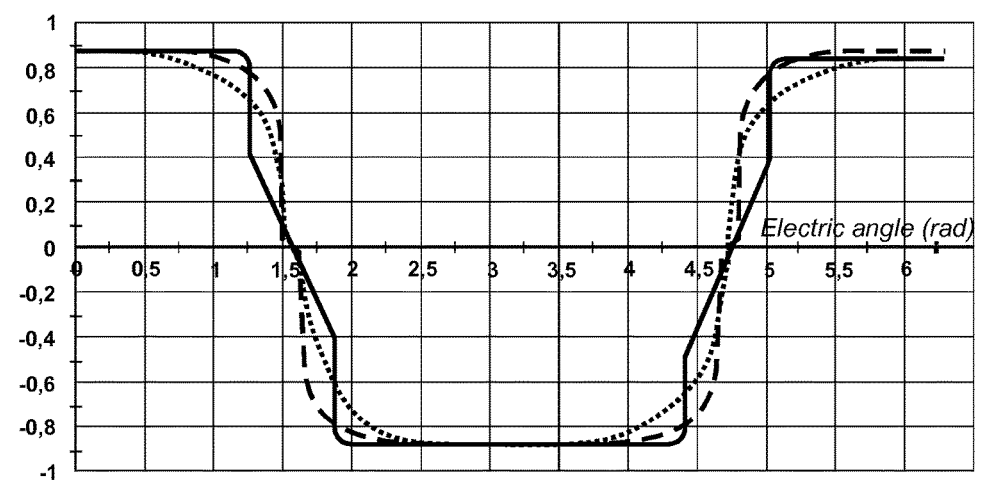
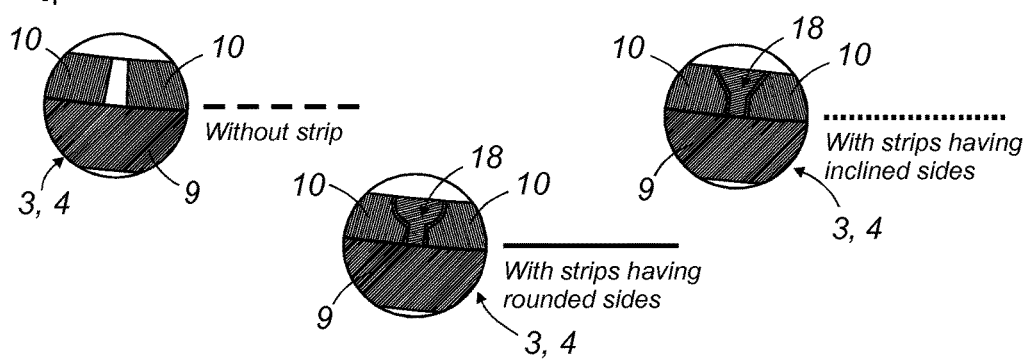

MAGNET-BEARING MOVING PART FOR PERMANENT MAGNET SYNCHRONOUS MACHINE

CROSS-REFERENCE TO RELATED APPLICATIONS

This application is a § 371 filing of PCT application PCT/FR2014/050352 filed on Feb. 20, 2014, which claims priority from French application FR 1351422 filed on Feb. 20, 2013. The disclosures of these applications are included by reference herein in their entirety.

BACKGROUND

Field of the Invention

The present invention relates to the general technical field of engines or machines with permanent magnets which are intended to generate an electric current.

The present invention particularly relates to a magnet-bearing moving part for a permanent magnet synchronous machine, such as a machine of the motor or generator type or any other rotating electrical machine or non-rotating permanent magnet machine.

A preferred application of the invention relates more specifically to a traction motor rotor, for example a rail traction motor. Another application concerns, for example, various types of road vehicles.

Description of Related Art

The permanent magnet synchronous machines comprise a moving part with a series of permanent magnets of alternating polarity and a fixed part called a stator comprising a set of induction coils.

Depending on the type of synchronous machines, the magnet-bearing moving part can move linearly relative to the stator or rotate relative thereto. In the latter case, it is called a rotor.

To generate an induction phenomenon, which sets in motion the moving part in the case of a motor or creates a current in the case of a generator, these moving parts comprise successive rows of permanent magnets positioned vis-à-vis the stator windings. These rows, parallel to each other, are conventionally oriented perpendicularly to the movement (that is to say, in the axial direction in the case of circular movement). For example, the magnets have the same polarity within the same row, but have alternating polarity from one row to the next. It is thus also possible to produce alternating polarities with magnets of the same polarity arranged in two or three successive rows.

Conventionally, the moving parts comprise a metal frame on which the magnets are secured by adhesion. To ensure satisfactory maintenance, the adhesive used must, however, have features that are compatible with the major stresses that the magnets are subjected to, regardless of the operating temperature.

Indeed, during the use of the synchronous machine, these magnets are subjected to multiple stresses acting in various directions. This refers to, for example, in the case of a rotating rotor, the following: axial stresses resulting from the magnetic attractions and repulsions between the magnets, radial stresses associated with the closure of the magnetic field of the stator, centrifugal stresses due to more or less rapid rotation of the rotor and tangential shear stresses due to the torque.

Currently, the tendency is to want to create synchronous machines that are increasingly powerful, while accommodating them in an increasingly smaller space. This commitment to improving the performance of synchronous machine has simultaneously led to a significant increase in the internal operating temperatures of these machines.

The adhesives used for securing the magnets on the moving part of these machines must thus be able to withstand such temperatures, while ensuring good performance of the magnets despite significant constraints. Such high temperature performance levels are difficult to obtain for an adhesive.

In addition, this increase in the internal operating temperature of the synchronous machines causes a structural expansion that is not of the same intensity as the respective composition of each part. A differential expansion is thus observed between the frame of the moving part, which is usually made of steel, and the magnets which are, for example, made of neodymium iron boron.

The adhesives used in order to ensure that the magnets are properly secured are rigid adhesives that generally do not have sufficient elasticity to be compatible with this differential expansion.

In the event of deformation of the moving part caused by such differences in expansion or by external constraints or by thermal runaway, for example, following a converter dysfunction, a rupture in the adhesive film is sometimes observed between the frame and the magnets, which can cause all or part of the magnets on the stator to slide. Such a rupture results in the sudden loss of performance of the synchronous machine, or even in a complete blockage thereof.

Another drawback of these synchronous machines is the abrupt alternation of the polarities of permanent magnets arranged in parallel rows during the movement of the moving part in front of the stator. This sudden change of North/South polarity of the magnets causes an oscillation of the torque with a very steep slope that generates vibrations and jolts in the gears, transmissions and all mechanical components. These vibrations, in addition to some passenger discomfort related to the noise generated, lead to premature wear or damage to the mechanical components.

In the case of a preferred application of these synchronous machines with motor-wheels, these sudden torque oscillations cause premature tyre wear.

In order to reduce the torque ripple due to the abrupt transition from one polarity to another, it has been proposed in the prior art that the magnets should not be positioned in rows perpendicular to the movement, but according to a helical arrangement. With such a helical arrangement, the transition between polarities of the successive rows of magnets is more gradual during the movement of the moving part. The torque oscillations are therefore absorbed.

In addition to or instead of this helical arrangement of the magnets of the movable part, it was also considered in the prior art that a helical arrangement should be implemented for the stator windings.

However, this particular helical arrangement of the magnets of the moving part and/or the stator coils is quite difficult to achieve. The installation of these elements, already difficult due to magnetic interactions between the magnets, becomes particularly complex and sensitive. The manufacture of these synchronous machines is complicated, lengthy and expensive.

In addition, because of this helical arrangement, the performance of the synchronous machine is significantly reduced.

BRIEF SUMMARY OF ASPECTS OF THE INVENTION

The objective of the invention is to provide a moving part for synchronous machines which does not have the abovementioned drawbacks and comprises a reliable mechanical device for securing the permanent magnets and which does not impair the performance of the machine.

Another objective of the invention is to complement the adhesion of the permanent magnets by ensuring that these magnets are perfectly secured regardless of the operating temperature of the machine.

Another objective of the invention is to provide a synchronous machine moving part whose magnets are arranged in rows perpendicular to the movement, but which, thanks to the particular shape of the magnets and the mechanical device for securing the magnets, allows damping of the torque oscillation comparable to that obtained with a helical arrangement, while maintaining a better performance.

Furthermore, as its magnets are placed in rows perpendicular to the movement, the moving part according to the invention does not present the same difficulties that are faced when manufacturing parts of the prior art with a helical arrangement. On the contrary, the invention offers a particularly practical and advantageous method for installing and securing of the permanent magnets on the frame of the moving parts.

In the present case, it will be necessary to understand the term "magnet" in the broad sense, denoting, on the one hand, elements made with conventional magnetic materials, and on the other hand, elements made with magnetisable materials. These magnetisable materials are, for example, made using ferrite materials or alloys like SmCo, AlNiCo or NdFeB.

Frame should be understood, among other things, as a support structure provided with a cylinder head.

The objectives of the invention are achieved by means of a magnet-bearing moving part for permanent magnet synchronous machines, provided for movement in front of a fixed stator comprising a set of induction coils. This moving part comprises a metal frame and a series of permanent magnets secured to the said frame, the said magnets being arranged in parallel rows and perpendicular to the movement of the moving part (that is to say, arranged in an axial direction in the case of circular movement) and being of the same polarity within the same row. This moving part also comprises at least one non-magnetic securing strip positioned longitudinally between two successive rows of permanent magnets and fixed mechanically to the frame.

The moving part according to the invention is characterised in that the said securing strip:
  extends substantially over the entire length of these two rows and contributes to blocking all the magnets of these two rows,
  comprises a support base with convex rounded sides, which ensures the vertical blocking of the magnets of these two rows, and a longitudinal upper extension that acts as a spacer between these two rows and provides lateral blocking of the magnets of these two rows on the side of the securing strip, and in that each magnet of these two rows comprises, at its edge adjacent to the securing strip, a concave rounded portion of a height equal to at least half of the total height of the magnet and of a shape complementary to the corresponding convexly rounded side of the support base of the securing strip, in which the support base of the securing strip is at least partially engaged.

According to an exemplary embodiment of the invention, the magnet-bearing moving part comprises a securing strip between each row of permanent magnets.

According to an exemplary embodiment of the invention, the securing strip is fixed to the frame using screws that pass through holes created in the frame and that are engaged in threaded holes of the securing strip.

According to a preferred embodiment of the invention, the width of the upper longitudinal extension of the securing strip is less than the diameter of the threaded holes in the securing strip.

According to a preferred embodiment of the invention, the said threaded holes are made in the support base of the securing strip, the upper longitudinal extension of the securing strip being interrupted at these threaded holes.

According to an exemplary embodiment of the invention of the magnet-bearing moving part, the convex rounded sides of the support base of the securing strip are involute or arcuate.

The magnet-bearing moving part is adapted to move linearly or rotationally, in a motor or a generator.

For example, the magnet-bearing moving part is a traction motor rotor.

According to an exemplary embodiment of the invention involving the magnet-bearing moving part, the permanent magnets are secured to the frame by adhesion.

According to an exemplary embodiment of the magnet-bearing moving part compliant with the invention, the permanent magnets and at least a part of the frame are coated with resin for support, retention and protection, which improves the holding of the said magnets.

The securing strip according to the invention advantageously helps to achieve the mechanical restraint of the permanent magnets in all directions, with the possible exception of the longitudinal blocking which may be provided by the shoulders of the frame.

According to another variant of the invention, the securing strip may further comprise, on at least one end thereof, an extension serving as an abutment to the last magnet of at least one of the two rows between which the securing strip is placed; this extension thus ensures longitudinal blocking of the magnets in this row.

The strip thus complements the adhesion and ensures that the magnets are perfectly secured even at high temperatures.

The adhesive used can be more flexible and elastic, as it only serves to implement a bedding between the magnets and the frame to ensure homogeneous support and to ensure provisional retention of the magnets up to the securing strips.

Moreover, the particular shape of the securing strip, and more specifically the shape of the sides of its support base (which is convexly rounded as well as complementary to the adjacent side of the magnets), help to obtain a reduction and then a gradual increase in the magnetic fields during the movement of the moving part in front of the stator and thus a softening of the torque ripple induced by the transition from one polarity to another.

Thanks to the invention, it is possible to obtain a damping of the torque ripple equivalent to that of the magnet-bearing moving parts with helical arrangement, but with better performance and a magnet and/or winding installation that is much easier and much less expensive.

The optimised shape of the strips and magnets, and in this case the concave/convex parts, help to obtain a gain in volume of the said magnets, thus contributing to their effectiveness.

The magnet-bearing part according to the invention also has the advantage of including securing means that allow only minute alternations, if any, to the magnetic field lines of a synchronous machine like a motor or a generator.

In the prior art, there is another type of strip that has been disclosed in the patent application US 2006/0220483. However, this strip is less effective and has many disadvantages.

Firstly, it has a limited length that corresponds to the length of a unit magnet and not to that of an entire row. A strip must thus be placed between each pair of magnets. It also requires three retainer screws and three spring washers per strip, which multiplies the number of parts to be installed and complicates the installation process.

In addition, the central part of the strip is very wide, is intended to be interposed between two magnets and accommodates the retainer screws and spring washers. The strip is almost half as wide as a magnet. The magnets are spaced out from each other, and the total area that can be dedicated to the magnetic components is greatly reduced. The magnetic flux decreases as a result, which causes a decrease in performance of the machine.

Finally, this prior strip comprises, in the upper part of its lateral edges, inclined support surfaces that rest on the upper part of the magnets, which is bevelled in a complementary manner, in order to ensure the vertical blocking of the magnets.

However, and as will be broadly explained below, these inclined support surfaces do not help achieve damping of the torque ripple, because of their inclined and unrounded shape, and because of their low height which is less than half of the total height of the magnet.

The objective of the invention is therefore not achieved.

The invention also provides a particularly advantageous method of securing the magnets to the frame of a magnet-bearing moving part for permanent magnet synchronous machines, provided for movement in front of a fixed stator with windings.

The objectives of the invention are achieved by means of a method of securing permanent magnets to a frame of a magnet-bearing moving part as presented above, characterised in that it comprises the following steps:
providing holes in the frame in radial directions,
using permanent magnets or magnetisable elements and making a succession of rows of the said permanent magnets or magnetisable elements on the frame, leaving empty spaces at least between the permanent magnets or magnetisable elements of different rows,
using the said permanent magnets or magnetisable elements on the frame using non-magnetic strips which are fixed on the said frame by means of screws passing through the holes and engaged in the said securing strips,
filling at least the free spaces with a support resin, polymerising the support resin, and
in the case where magnetisable elements are used, magnetising the said magnetisable elements so that they are permanent magnets.

According to an exemplary implementation, the method according to the invention consists in securing magnetisable elements or permanent magnets to the frame, also by a prior adhesion operation in addition to the securing operation using securing strips.

According to an exemplary implementation, the method according to the invention consists of fastening the securing strips directly on the frame using screws.

The invention also provides a permanent magnet synchronous machine characterised in that it comprises a magnet-bearing moving part as described above.

BRIEF DESCRIPTION OF THE DRAWINGS

Other characteristics and advantages of the invention will appear on reading the detailed description which will follow, this description is made with reference to the accompanying drawings, in which:

FIG. 3 is a perspective side view of the rotor of the synchronous machine of FIG. 1, including a securing strip according to the invention, which has been represented in a disassembled state;

FIG. 4 is a planar side view of the rotor of FIG. 1;

FIGS. 11 to 15 are illustrations of an exemplary securing strip according to the invention, depicted with perspective, cross-sectional, longitudinal section, flat side and flat top views respectively;

FIG. 16 is a cross-sectional view of the upper part of the rotor of FIG. 5, with the section passing through the screws of the securing strips;

FIG. 17 is a graph showing the induction produced in the air gap by the magnets, with broken lines in the case of a vector rotor without a securing strip, a continuous line in the case of a rotor with strips that have rounded sides according to the invention and dashed lines in the case of a rotor with strips that have inclined sides;

DETAILED DESCRIPTION OF ASPECTS OF THE INVENTION

Figure 1:
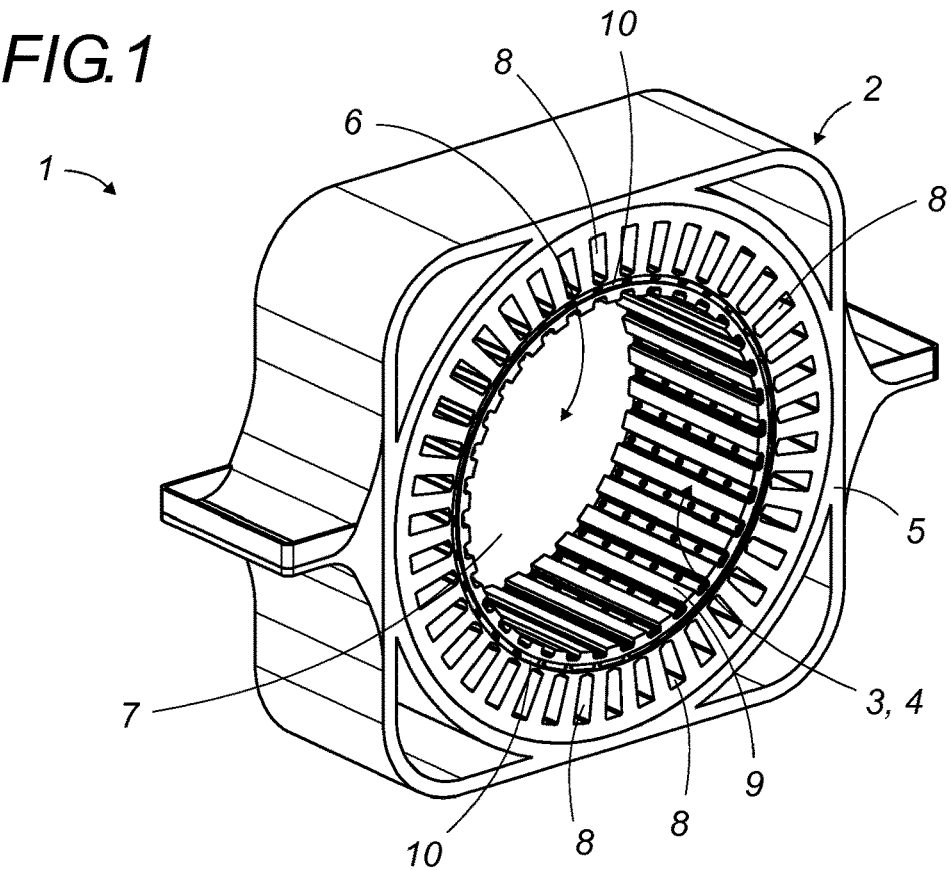
FIGS. 1 and 2 are side views, i.e. perspective and planar views respectively, of a permanent magnet synchronous machine consisting of an outer stator and an inner rotor according to a first variant of the invention.
Figure 2:
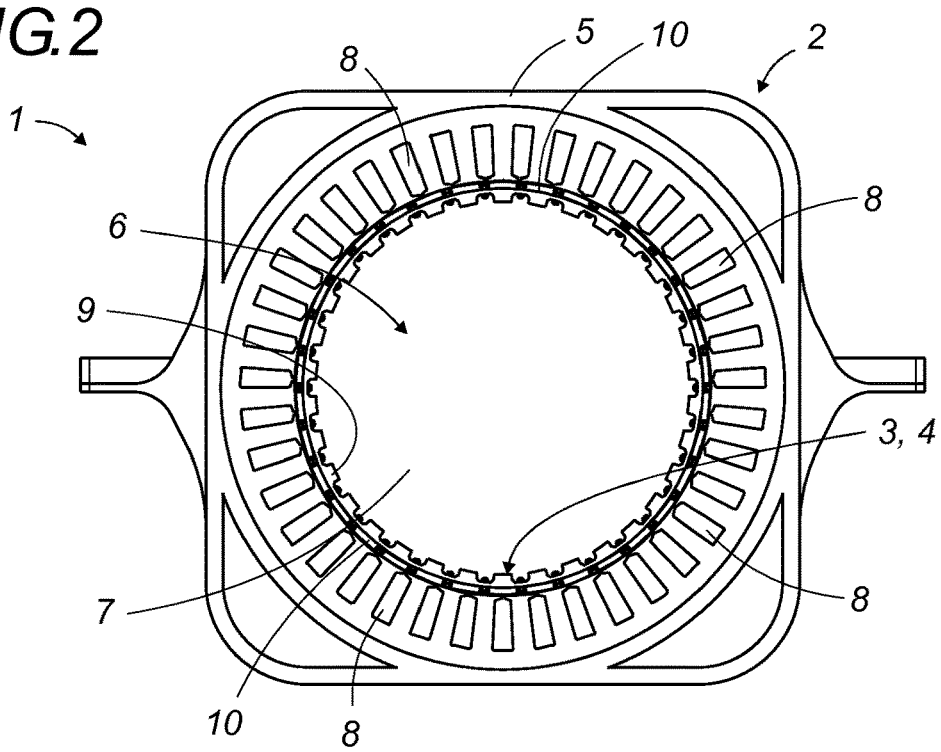
Figure 5:
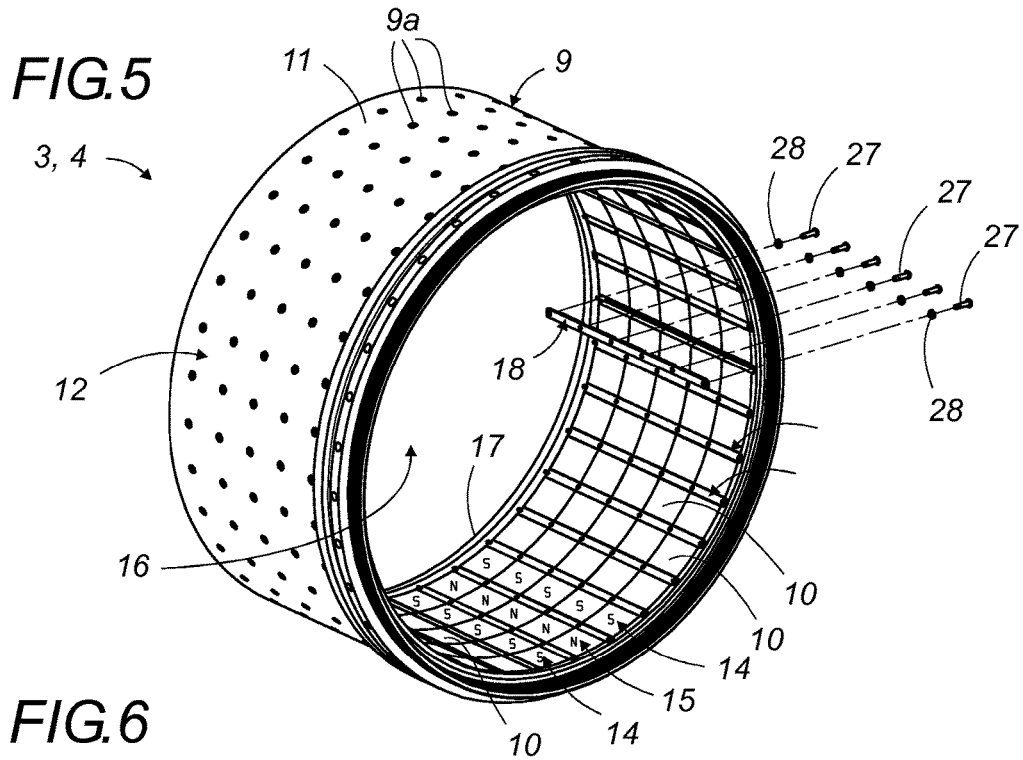
FIG. 5 is a perspective side view of an outer rotor according to another embodiment of the invention, and the securing strip of the rotor is shown in a disassembled state.
Figure 6:
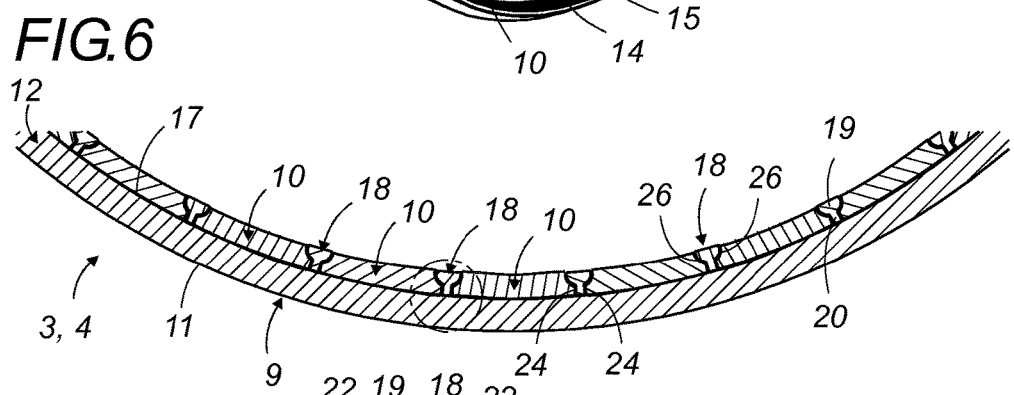
FIG. 6 is a cross-sectional view of the lower part of the outer rotor of FIG. 5.

The present invention will now be described in detail with reference to FIGS. 1 to 19. Equivalent elements shown in different figures will bear the same numerical or alphanumerical references.

FIGS. 1 to 4 depict a first example of a permanent magnet synchronous machine (1) according to the invention. This synchronous machine (1) conventionally comprises a fixed part called the stator (2) and a moving part (3). The moving part (3) shown is a rotor which moves by rotating in relation to the stator (2).

Although this has not been shown in the various figures, the invention can be applied similarly to a synchronous machine that comprises a moving part (3) with linear movement.

The stator (2) shown is an external stator comprising a peripheral frame (5) in casing which is for example, substantially parallelepipedal, which contains a central chamber (6) that is hollow and cylindrical in shape for accommodating the rotor (4). The central cylindrical chamber (6) is open on each of its circular sides (7) and thus delimits a passing inner volume for the reception of the rotor (4).

The stator (2) also comprises a series of induction coils (8), also called windings, arranged around the central chamber (6) and appropriately in the immediate vicinity thereof to achieve the desired induction phenomenon.

The moving part (3) is located in the central chamber (6). This moving part, in the embodiment shown in FIGS. 1 to 4, is an inner rotor (4), that is to say, placed inside the stator (2).

The rotor (4) comprises a frame (9), which is preferably metallic, cylindrical in shape and of a diameter slightly less than that of the cylindrical central chamber (6) of the stator (2).

It further comprises multiple permanent magnets (10) that are fixed to the outer side (11) of the longitudinal wall (12) of the cylindrical frame (9). These magnets (10) are preferably flat and generally parallelepipedal with a low height and substantially rectangular or square bases. The magnetic poles of these magnets (10) are located at their bases, one being of North polarity and the other South.

The permanent magnets (10) are arranged in rows (13) parallel to one another and oriented in the axial direction of the cylinder.

All the permanent magnets (10) in the same row (13) are of the same polarity, that is to say, they are arranged such that all of them have the base of the same pole (North or South) of the same side. For example, they all have their North polarity base facing the longitudinal wall (12) of the frame (9) and their South polarity base facing the exterior of the rotor (4), thereby forming a "South row" (14), or conversely their South polarity base facing the frame (9) and their North polarity base facing the exterior of the rotor (4), thereby forming a "North row" (15).

Their polarity is reversed alternately from one row (13) to another; the North rows (15) and the South rows (14) alternate over the entire surface of the longitudinal wall (12) of the frame (9).

Owing to this arrangement, the magnets (10) tend to repel each other within the same row (13), but attract each other from one row to another.

According to another embodiment of the moving part (3) compliant with the invention, several successive rows (13), maybe two or three, have magnets (10) of the same polarity.

When the rotor (4) is placed in the position of use, in the central chamber (6) of the stator (2), the permanent magnets (10) of the rotor (4) are found in the vicinity of and facing the induction coils (8) of the stator (2) and can function therewith. Passing an electric current through the induction coils (8) of the stator (2) causes a rotational movement of the rotor (4) in the case of a synchronous machine (1) used as a motor, and the rotation of the rotor (4) causes the occurrence of an alternating current in the induction coils (8) of the stator in the case of a synchronous machine (1) used as a generator.

Obviously, the invention also applies to synchronous machines (1) comprising an inner stator (2) and an outer rotor (4).

In this case, the stator (2) is of a diameter smaller than that of the rotor (4) and is intended to be placed inside the latter. The induction coils of the stator are located on its periphery facing the outer rotor.

An example of the outer rotor (4) has been shown in FIGS. 5 to 10. It comprises a frame (9), which is preferably metallic, of cylindrical shape and which defines in its hollow interior volume a reception space (16) for the stator (2).

It comprises multiple permanent magnets (10) which are fixed on an inner side (17) of the longitudinal wall (12) of its cylindrical frame (9) so as to be placed in the position of use, close to and facing the induction coils (8) of the stator placed in the reception space (16).

The permanent magnets (10) are arranged in rows (13) parallel to one another and are oriented in the axial direction of the cylinder.

All the permanent magnets of the same row (13) have the same polarity. For example, they all have their North polarity base facing the longitudinal wall (12) of the frame (9) and their South polarity base facing the interior of the rotor (4), thereby forming a "South row" (14). Conversely, if their South polarity base is facing the frame (9) and their North polarity base is facing the interior of the rotor (4), they form a "North row" (15).

According to another non-exhaustive embodiment, their polarity is reversed alternately from one row to another; the North rows (15) and the South rows (14) succeed each other alternately over the entire surface of the longitudinal wall (12) of the frame (9).

Regardless of whether it is an inner rotor (4) or an outer rotor or a moving part with linear movement, the moving part (3) comprises, according to the invention, at least one securing strip (18) which is an elongated piece that extends longitudinally between two successive rows (13) of permanent magnets (10). The moving part (3) preferably comprises several magnets, and a securing strip (18) between each of the rows (13) of permanent magnets (10).

The securing strips (18) extend parallel to the rows (13) of permanent magnets (10), and therefore in a direction substantially perpendicular to the movement of the moving part (3). They are thus arranged in the axial direction of the cylindrical rotor (4) in the embodiments shown.

The securing strips (18) preferably extend over the entire length of the rows (13) of permanent magnets (10). A single securing strip (18) may thus be sufficient to achieve the blocking of magnets (10) along the entire length of the row (13).

The securing strips (18) are made of a non-magnetic material, for example non-magnetic stainless steel.

An example of such a securing strip (18) has been shown in FIGS. 11 to 15.

As seen in these figures and more particularly in the sectional view of FIG. 12, the securing strip (18) of the invention comprises a support base (19) extended by a longitudinal upper extension (20).

The support base (19) has a lower side (21), which is planar, and convex curved lateral sides (22). These lateral sides (22) are preferably rounded, and more preferably involute or arcuate. Curved shapes without sharp angles are preferred because they prevent concentrations of field lines.

As regards these lateral sides (22), a rounded shape is also broadly preferable to a simple inclined shape as will be shown by reference to FIG. 17.

Indeed, if sides inclined over a sufficient height can achieve good damping of the torque ripple, they also result in a significant reduction in the average torque, which significantly degrades the performance of the synchronous machine.

The longitudinal upper extension (20) of the securing strip (18) has, for example, a generally rectangular shape, on the upper side (23).

Figure 7:
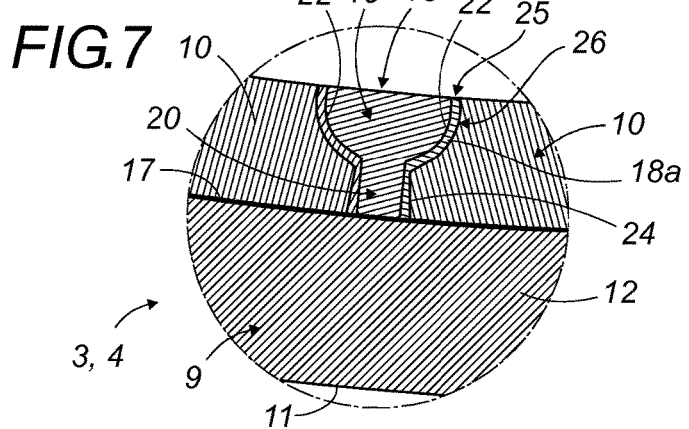
FIG. 7 is an enlargement of the detail circled in FIG. 6.
Figure 8:
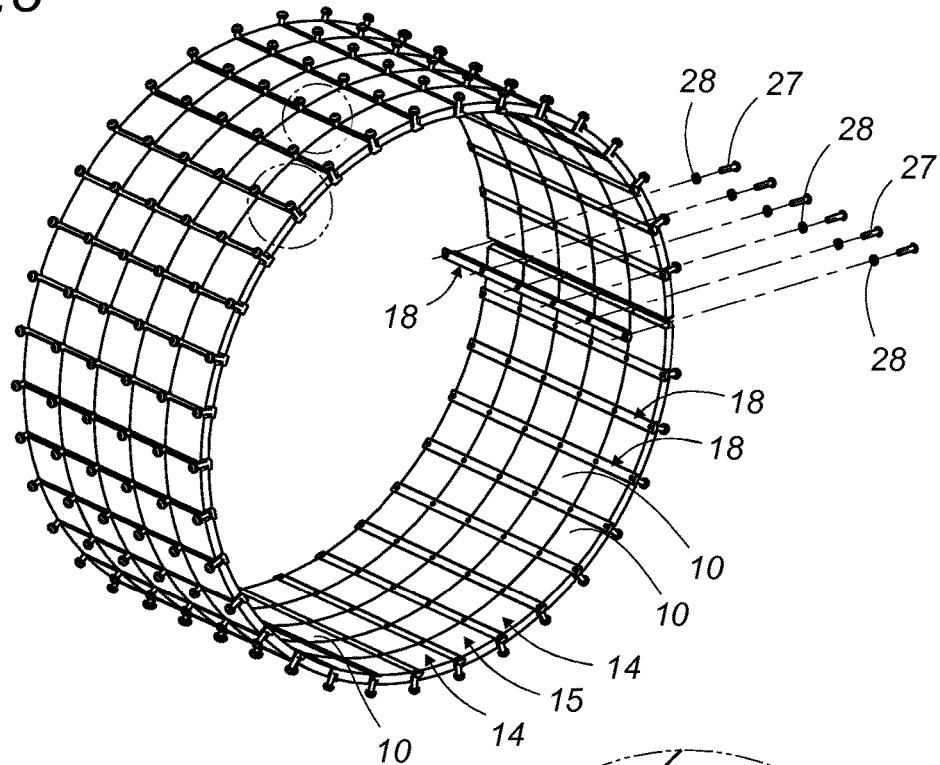
FIG. 8 is a perspective view of the rotor of FIG. 5 where no frame has been shown.
Figure 9:
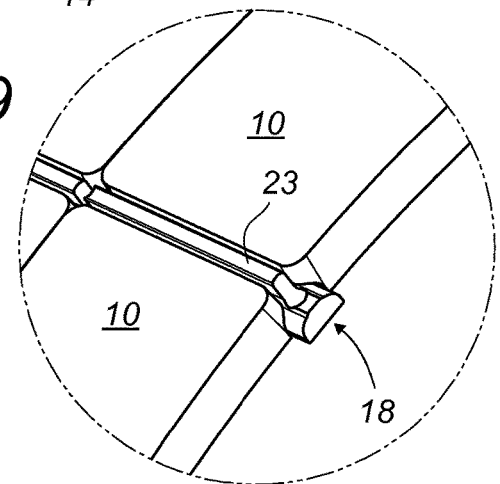
FIG. 9 is an enlargement of the detail on the left circled on FIG. 6, in which the screws are not shown.
Figure 10:
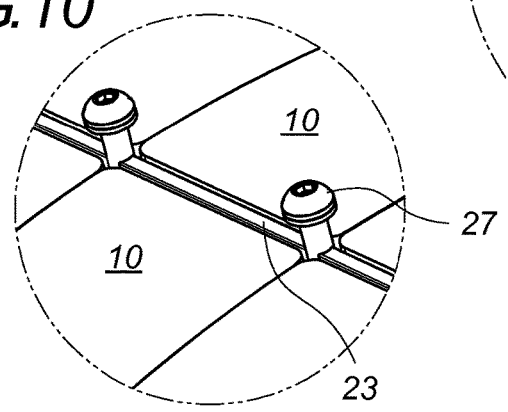
FIG. 10 is an enlargement of the detail on the right circled in FIG. 8.
Figure 18:
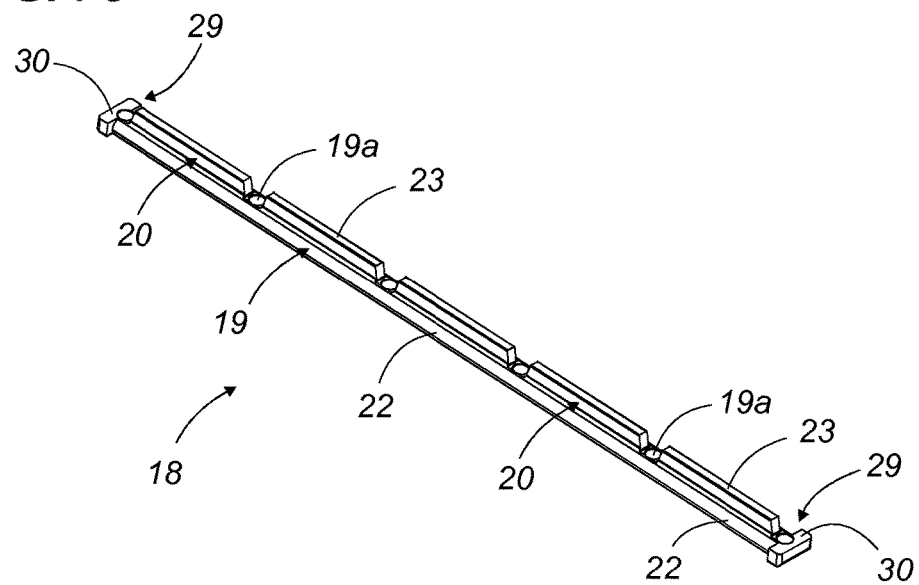
FIG. 18 is a perspective view of another exemplary securing strip according to the invention.
Figure 19:
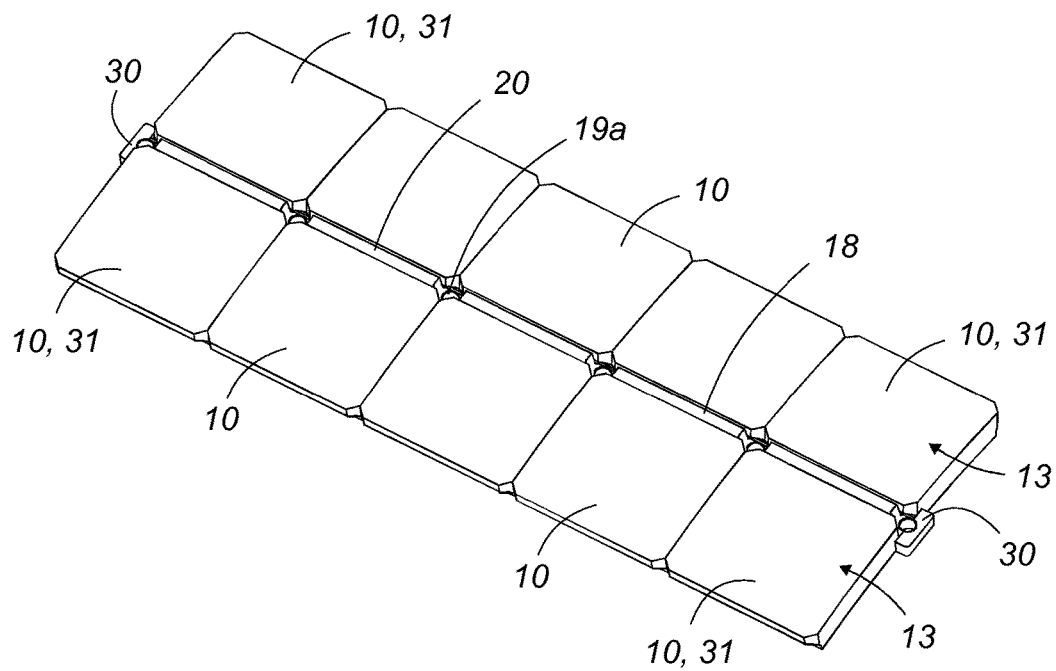
FIG. 19 is a perspective top view of the securing strip of FIG. 18 placed between two rows of magnets.

As can be seen in particular in FIG. 7, when the securing strip (18) is placed on the moving part (3), it is interposed between two rows (13) of permanent magnets (10). Its longitudinal extension is inserted between the two rows (13)

of magnets in the manner of a spacer separating the edges (24) from the magnets, with the upper side (23) facing the frame (9). It thus ensures the lateral blocking of the magnets (10), that is to say, the blocking in a direction tangential to the movement in the case of circular movement.

Preferably, the width of the longitudinal extension (20) is as small as possible, while still being sufficient to ensure satisfactory mechanical strength, so as to leave as much space as possible for the magnets (10), which are very close to each other.

The surface of the magnetic elements is thus maximal, which ensures a very strong magnetic flux and improved performance of the synchronous machine.

By way of example, in the preferred embodiment shown, the area occupied by the securing strips (18) is only about 5% of the total area, the remainder being occupied by the magnetic elements.

The lateral sides (22) of the support base (19) rest on the longitudinal upper edges (25) of the magnets (10), and thus ensure the vertical (or axial) blocking of the magnets (10) on which they rest.

Advantageously, the magnets (10) located on either side of the securing strip (18) comprise, at their longitudinal upper edges (25) and their other edge (24), a concave portion (26) of a rounded shape complementary to that of the corresponding lateral rounded side (22) of the support base (19) of the securing strip (18), in which the support base (19) of the securing strip (18) is at least partially engaged.

In order to ensure satisfactory damping of the torque ripple, the height of the concave portion (26) of the magnet (10) must be of sufficient height, that is to say, at least equal to half of the total height of the magnet.

The securing strips (18) are mechanically secured on the frame (9) of the moving part (3) by any suitable securing means, for example by using screws or by riveting, bolting, crimping, or other similar means.

The fixing means used may also be made of non-magnetic material.

On the examples shown, the securing strips (18) are screwed to the frame (9) of the rotor (4) using a set of screws (27) and washers (28). Holes 19a and 9a are provided to this effect in the support base (19) and the frame (9) respectively. The holes (19a) are, for example, piercings with a threading for engaging the screws (27).

On the preferred embodiment shown, the longitudinal upper extension (20) of the securing strips (18) is narrower than the diameter of the threaded holes (19a) of the securing strip (18).

Therefore, the longitudinal upper extension (20) is preferably interrupted at these threaded holes (19a) that are only made in the support base (19) of the securing strip (18).

Advantageously, the securing strip (18) of the invention can be securely fixed to the frame (9) with the minimum number of screws (27). A screw placed at the end of the magnets is sufficient and it is thus not necessary to machine the magnets (10) specially to be able to pass additional screws (27) between the pairs of juxtaposed magnets. The number of parts to put in place is limited and the installation process extremely simple and quick Another variant of the invention has been shown in FIGS. 18 and 19.

In this variant, the securing strip (18) comprises at one of its ends (29), or preferably at both ends (29), an extension (30) which serves as an abutment (31) to the last of the magnets (10) of at least one of the two rows (13) between which the securing strip (18) is placed. This extension (30) thus ensures the longitudinal blocking of the magnets (10) of this row (13) of magnets.

Advantageously, the extension (30) may, as shown, exceed both sides of the securing strip (18) and thus simultaneously secure the longitudinal blocking of the magnets (10) of the two rows (13) of magnets between which the securing strip (18) is interposed.

The permanent magnets (10) may also be made of magnetisable elements. The assembly of these elements is thus facilitated to the extent that the magnetisation of the said elements occurs after they are mounted on the frame (9).

The invention relates to a method of securing permanent magnets to a frame (9) of a magnet-bearing moving part as presented above. This method is implemented using the following steps:

providing holes (9a) in the frame (9) in radial directions,
using elements made using magnetisable materials and placing a succession of rows (13) of elements on the frame, leaving free spaces at least between elements of different rows (13),
using the elements on the frame (9) using at least the non-magnetic securing strips (18) which are secured to the said frame by means of screws (27) passing through the holes (9a) and engaged in the said securing strips (18),
filling the free spaces with a support resin,
polymerising the support resin, and
magnetising the elements so that they are permanent magnets (10).

According to an implementation variant of the method of the invention, the said method comprises the following steps:

provide holes (9a) in the frame (9) in radial directions,
using permanent magnets (10) and placing a succession of rows (13) of permanent magnets (10) on the frame (9), leaving empty spaces at least between the magnets (10) of different rows (13),
using the permanent magnets (10) on the frame (9) using at least the securing strips (18) which are secured to the said frame (9) by means of screws (27) passing through the holes (9a) and engaged in the said securing strips (18),
filling the free spaces with a support resin, and
polymerising the support resin.

The magnetisable elements or the permanent magnets (10) are, for example, secured to the frame (9) by a prior adhesion operation in addition to the securing operation using securing strips (18).

According to an exemplary implementation, the method according to the invention consists of screwing the securing strips (18) directly to the frame (9) or onto a cylinder head attached to a frame (9).

FIG. 7 shows, by way of example, the use of a support resin (18a), for ensuring a flexible connection and placing the magnets (10) before mounting the securing strips (18). When mounting the securing strips (18), and more precisely when tightening the screws (27), a part of the support resin (18a) will preferably be pushed into the gaps between the magnets (10) and the securing strips (18). The polymerisation of the support resin (18a) thus distributed contributes to the maintenance and protection of the assembly formed.

FIG. 17 illustrates the damping effect of the torque ripple obtained with the device according to the invention.

The curves shown on the graph of FIG. 17 represent the induction produced in the gap by the magnets (10) in three different scenarios.

Broken lines are used to show the case of a rotor which has no securing strips for holding the magnets (10) which are simply secured to the frame (9) by adhesion. The magnets (10) are parallelepipedal and have vertical sides.

In this first case, the induction is reversed abruptly upon movement of the magnet-bearing moving part. The torque generated thus has a high level of ripple, caused by the abrupt transition from one polarity to another.

Dotted lines are used to show the case of a rotor whose magnets (10) are held by a securing strip (18) with lateral inclined edges (22).

It is noted that in this case, the reversal is significantly softened, which greatly reduces the ripple level of the torque. However, upon movement of the rotor, there are significant areas where induction is not at its maximum. The average torque is greatly reduced, which degrades the overall performance of the machine in a highly disadvantageous manner.

The third case, shown by a solid line, corresponds to a rotor whose magnets (10) are held by a securing strip (18) with rounded lateral edges (22) according to the invention.

It is then found that the inversion occurs gradually and over a limited period. This advantageously helps to maintain a high average torque while reducing torque ripple.

Obviously, the invention is not limited to the preferred embodiments described above and illustrated in the various figures; a person skilled in the art can make numerous changes to it and create other variants without departing from the scope or extent of the invention defined in the claims.

The invention claimed is:

1. A magnet-bearing moving part for a permanent magnet synchronous machine provided for movement in front of a fixed stator comprising a set of induction coils, the moving part comprising a metallic frame and a series of permanent magnets integrated into the frame, the magnets arranged in parallel rows and perpendicular to the movement of the moving part, the magnets being of the same polarity within each row, the moving part also comprising at least one non-magnetic securing strip longitudinally placed between two successive rows of the series of permanent magnets and mechanically secured to the frame, wherein each of the at least one securing strips:

extends substantially over an entire length of the two successive rows and contributes to blocking all magnets of the two successive rows, and comprises a support base with convex rounded lateral sides, the convex rounded lateral sides providing vertical blocking of magnets of the two successive rows, and a longitudinal upper extension that acts as a spacer between the two successive rows and providing lateral blocking of magnets of the two successive row, and wherein each magnet of the two successive rows comprises a concave rounded portion having a height equal to at least half of a magnet height and a shape complementary to one of the convex rounded lateral sides of the support base; and wherein the concave rounded portion of each magnet comprises a concave rounded portion of a corner of each magnet facing the set of induction coils.

2. The magnet-bearing moving part according to claim 1, wherein the at least one non-magnetic securing strip comprises a plurality of non-magnetic securing strips, and wherein one of the plurality of securing strips is positioned between each of the rows of permanent magnets.

3. The magnet-bearing moving part according to claim 1, wherein the at least one non-magnetic securing strip is fixed to the frame using screws that pass through holes in the frame and engage threaded holes of the securing strip.

4. The magnet-bearing moving part according to claim 3, wherein a width of the longitudinal upper extension is smaller than a diameter of the threaded holes of the securing strip.

5. The magnet-bearing moving part according to claim 4, wherein the threaded holes are formed in the support base, and wherein the longitudinal upper extension is interrupted at the threaded holes.

6. The magnet-bearing moving part according to claim 3, wherein the threaded holes are formed in the support base, and wherein the longitudinal upper extension is interrupted at the threaded holes.

7. The magnet-bearing moving part according to claim 1, wherein the at least one non-magnetic securing strip comprises, on at least one end thereof, an extension serving as an abutment to a last magnet of at least one of the two successive rows, and wherein the extension provides longitudinal blocking of the last magnet of at least one of the two successive rows.

8. The magnet-bearing moving part according to claim 1, wherein the convex rounded lateral sides of the support base are involute or arcuate.

9. The magnet-bearing moving part according to claim 1, wherein the moving part comprises one of a linear moving part and a rotating moving part, for one of a motor and a generator.

10. The magnet-bearing moving part according to claim 1, wherein the moving part comprises a traction motor rotor.

11. The magnet-bearing moving part according to claim 1, wherein the permanent magnets are secured to the frame by adhesion.

12. The magnet-bearing moving part according to claim 1, wherein the permanent magnets and at least a part of the frame are coated with resin.

13. A method of securing permanent magnets to a frame of a magnet-bearing moving part according claim 1, wherein the method comprises the following steps:

providing holes in the frame in radial directions, making rows using permanent magnets or magnetisable elements and arranging the rows on the frame, while leaving spaces between the rows of permanent magnets or magnetisable elements, mounting the permanent magnets or magnetisable elements on the frame using the at least one non-magnetic securing strips which are secured to the frame by screws passing through the holes and engaged in the at least one non-magnetic securing strips, filling the spaces with a support resin, polymerising the support resin, and wherein, when magnetisable elements are used, magnetising the magnetisable elements.

14. The method of securing permanent magnets to a frame according to claim 13, wherein the method further comprises a prior adhesion operation.

15. The method of securing permanent magnets to a frame according to claim 13, wherein the method further comprises fastening the at least one non-magnetic securing strips directly on the frame using screws.

16. A synchronous machine with permanent magnets, comprising the magnet-bearing moving part according to claim 1.

17. The magnet-bearing moving part according to claim 1, wherein the concave rounded portion of each magnet decreases a height of each magnet adjacent the at least one securing strip.

18. The magnet-bearing moving part according to claim 1, wherein an upper surface of each of the at least one securing strip is coplanar with an upper surface of magnets in the two successive rows.

19. The magnet-bearing moving part according to claim 1, wherein the magnets in the two successive rows do not radially extend beyond the at least one securing strip.

20. The magnet-bearing moving part according to claim 1, wherein the concave rounded portion of each magnet of the two successive rows comprises a concave rounded portion in the radially inward surface of each magnet.

21. The magnet-bearing moving part according to claim 1, wherein the concave rounded portion of each magnet provides reduced torque ripple compared to a magnet not having the concave rounded portion.

* * * * *